Patented May 16, 1950

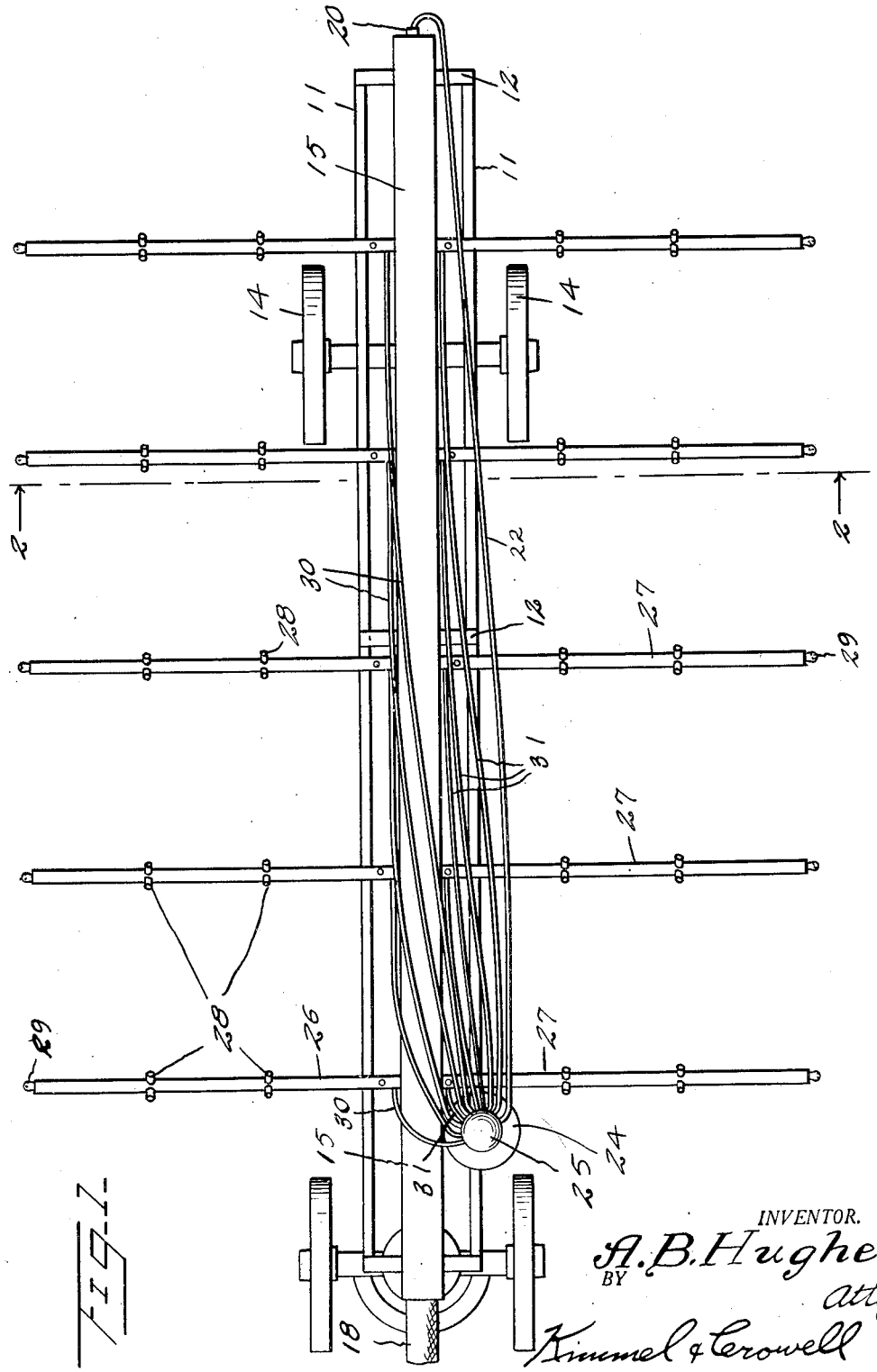

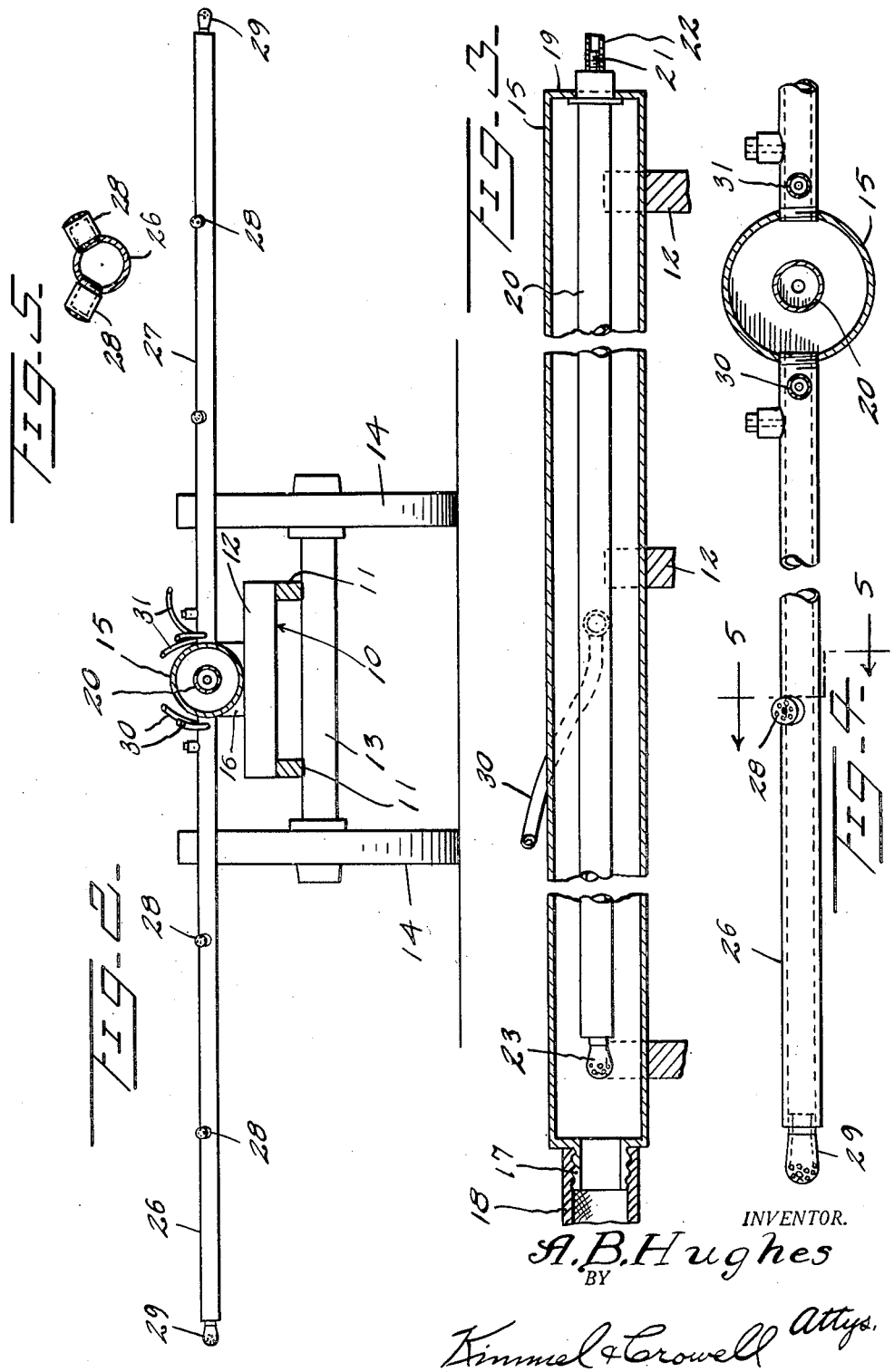

2,507,524

UNITED STATES PATENT OFFICE 2,507,524

SPRAYING DEVICE

Austin B. Hughes, Tishomingo, Okla.

Application August 28, 1945, Serial No. 613,184

4 Claims. (Cl. 299—29)

This invention relates to an improvement in irrigating machines for discharging water, under pressure, onto the surface of the ground.

An object of this invention is to provide a machine of this kind which will discharge water from a plurality of nozzles onto the ground, the water being under air pressure which is so arranged as to prevent back pressure of air in the supply system.

A further object of the invention is to provide an irrigating machine of this kind which is portable so that it can be moved along the surface of the ground and may discharge water in a plurality of ditches or channels as it is being moved over the ground.

With the foregoing objects in view, and others which may hereinafter more fully appear, the invention consists of the novel construction, combination and arrangement of parts, as will be more specifically described, and illustrated in the accompanying drawings, wherein are shown embodiments of the invention, but it is to be understood that changes, variations and modifications may be resorted to which fall within the scope of the invention, as claimed.

In the drawings:

Figure 1 is a detail top plan of an irrigating machine constructed according to an embodiment of this invention.

Figure 2 is a sectional view taken on the line 2—2 of Figure 1.

Figure 3 is a longitudinal section, partly broken away, of the manifold.

Figure 4 is a transverse section on an enlarged scale, similar to Figure 2.

Figure 5 is a sectional view taken on the line 5—5 of Figure 4.

Referring to the drawings the numeral 10 designates generally a frame structure which includes a pair of longitudinal elongated beams 11 connected together by transverse connecting bars 12. A pair of axles 13 are disposed beneath the frame 10 adjacent the opposite ends thereof, and each axle has rotatably mounted thereon a pair of wheels 14.

An elongated tubular manifold 15 is secured to the frame 10, being mounted in a pair of cradle members 16 which are secured to the upper sides of the transverse frame members 12. The manifold 15, has a threaded or ribbed nipple 17 at its forward end with which the flexible water supply pipe 18 is adapted to be connected. The opposite or rear end of the manifold has an end wall 19 through which an elongated air pipe 20 extends. The air pipe 20 extends interiorly and lengthwise of the manifold 15, and terminates at its forward end at a point rearwardly from the forward end of the manifold 20.

The nipple 21 is carried by the rear projecting end of the air pipe 20, and a flexible hose 22 is engaged with the nipple 21. A nozzle 23 is secured in the forward end of the air pipe 20 being positioned rearwardly from the forward end of the manifold 20, and is adapted to discharge air into the water or other liquid which is positioned within the manifold 15. This discharge of air into the liquid within the manifold 15 assists in the atomization of the liquid where it is discharged or broadcast from the nozzles hereinafter described.

An air pressure tank 24 is fixedly secured to the frame 10, at one side of the manifold 15, and the hose 22 is connected to the dome 25 of the air tank 24. The tank 24 is adapted to be supplied with air under pressure from a pump or other supply means, not shown.

The manifold 20 has secured thereto, a plurality of laterally extending pipes 26 and 27. The pipes 26 and 27 are in alinement extending from the opposite sides of the manifold 15, and there may be as many of these pipes 26 and 27 along the length of the manifold 15 as may be desired. The pipes 26 communicate with the manifold 15, and the pipes 26 and 27 have secured thereto pairs of oppositely directed nozzle members 28. The nozzle members 28 are upwardly directed so as to provide for the discharge of liquid upwardly and rearwardly and forwardly of the movement of the device over the ground.

The pipes 26 and 27 also have secured to their outer ends nozzle members 29 for discharging water at the outer ends of the discharge pipes.

In order to provide a means whereby pressure may be evenly maintained in all of the pipes 26 and 27, I have provided flexible air conducting pipes 30, each of which is connected at one end to the inner portion of one of the pipes 26, and flexible pipes 31, each of which is connected to the inner end portion of one of the pipes 27. The flexible members 30 and 31 are connected to the dome 25 so that the air pressure from the tank 24 will be communicated to the liquid discharge pipes 26 and 27 for reducing the pressure drop between the flexible water supply pipe 18 and the discharge pipes 26 and 27, and also to assist in atomization of the water discharged through the nozzles 28 and 29. The introduction of air pressure to the discharge pipes 26 and 27 will also tend to equalize the pressure in the various discharge pipes irrespective of the point along the manifold to which they are connected, that is, irrespective of the distance from the point of introduction of the water supply into the manifold 15. The air pressure is maintained at a value lower than that of the water or liquid in the supply pipe 18. However, since the water or liquid system is open at one end, considerable pressure drops will be experienced at the point where the supply pipe 18 communicates with the manifold 15 and also along the length of the manifold and communicating discharge pipes 26 and 27. The air pressure will be sufficient to equalize the pressure drops and to obtain uniform spraying from the several nozzles 28 and 29.

In the use and operation of this device the supply member 18 is adapted to be connected to a source of water supply which may be under pressure. A second air pump is also adapted to be connected to the air tank 24, for maintaining the desired air pressure in this tank.

As the structure is moved over the surface of the ground the water from the manifold 15 will be discharged through the lateral branch and pipes 26 and 27, and the air pressure from tank 24 will be communicated through the flexible hoses 30 and 31 to the discharge branches so that the desired fluid pressure will be evenly maintained for all of the discharge members. In this manner the fluid will be evenly discharged from the spray nozzles or jets 28, over the surface of the ground.

It will, of course, be understood that these nozzles 28, as shown, are formed to provide a broken spray so that the entire surface of the ground will be moistened as the device is moved thereover.

The exact configuration illustrated is regarded as the optimum, but some of the desirable results inherent in this disclosure may be obtained by various slight modifications including some departure from the exact configuration shown, and it is, therefore, requested that the scope of the invention should be regarded as limited only by the terms of the claims.

What I claim is:

1. An irrigating means comprising a wheeled frame, a tubular manifold carried by and extending lengthwise of said frame, means connecting said manifold with a liquid source, a plurality of opposed laterally extending discharge pipes connected to said manifold, nozzles carried by said discharge pipes, an air pressure tank carried by said frame, means connecting the portions of said discharge pipes adjacent to said manifold to said tank, an air pipe disposed within and extending lengthwise of said manifold, a nozzle on said latter pipe within said manifold, and means connecting said latter pipe to said tank.

2. An irrigating means as set forth in claim 1 wherein said first mentioned nozzles are arranged in pairs with the members of each pair oppositely inclined.

3. An irrigating means as set forth in claim 1 wherein said latter mentioned air pipe is of less length than said manifold whereby the air pressure discharged therefrom will be communicated to the liquid in said manifold.

4. An irrigating means comprising a frame, a manifold carried by said frame, means connecting said manifold with a liquid source, laterally extending discharge pipes connected to said manifold, nozzles carried by said discharge pipes, an air pressure tank carried by said frame, means connecting the portions of said discharge pipes disposed adjacent to said manifold to said tank, and an air pipe connected to said tank and opening within said manifold.

AUSTIN B. HUGHES.

REFERENCES CITED

The following references are of record in the file of this patent:

UNITED STATES PATENTS

| Number | Name | Date |
|---|---|---|
| 410,187 | Partington | Sept. 3, 1889 |
| 840,287 | Bardsley | Jan. 1, 1907 |
| 980,002 | Price | Dec. 27, 1910 |
| 1,553,370 | D'Arcy | Sept. 15, 1925 |
| 1,895,739 | Spindt | Jan. 31, 1933 |